(12) United States Patent
Lucas

(10) Patent No.: US 7,776,217 B2
(45) Date of Patent: Aug. 17, 2010

(54) BIORETENTION SYSTEM AND METHOD

(76) Inventor: William Lucas, 3 Lucas La., Malvern, PA (US) 19355

(*) Notice: Subject to any disclaimer, the term of this patent is extended or adjusted under 35 U.S.C. 154(b) by 0 days.

(21) Appl. No.: 12/425,246

(22) Filed: Apr. 16, 2009

(65) Prior Publication Data
US 2009/0261036 A1 Oct. 22, 2009

Related U.S. Application Data

(60) Provisional application No. 61/045,506, filed on Apr. 16, 2008, provisional application No. 61/149,175, filed on Feb. 2, 2009.

(51) Int. Cl.
C02F 3/32 (2006.01)
C02F 3/04 (2006.01)
B01D 33/70 (2006.01)

(52) U.S. Cl. ............ 210/602; 210/617; 210/807; 210/109; 210/150; 210/170.03; 210/263; 210/290; 210/903; 210/906

(58) Field of Classification Search ........ 210/602, 210/615, 616, 617, 620, 767, 807, 97, 109, 210/150, 170.03, 263, 264, 290, 903, 906
See application file for complete search history.

(56) References Cited

U.S. PATENT DOCUMENTS

| | | | |
|---|---|---|---|
| 4,184,947 A * | 1/1980 | Demisch | ............ 210/617 |
| 4,707,270 A | 11/1987 | Kobayashi | |
| 5,322,629 A | 6/1994 | Stewart | |
| 5,462,666 A | 10/1995 | Kimmel | |
| 5,702,593 A | 12/1997 | Horsley | |
| 5,733,453 A | 3/1998 | DeBusk | |
| 5,863,433 A | 1/1999 | Behrends | |
| 5,876,606 A | 3/1999 | Blowes | |
| 5,893,975 A | 4/1999 | Eifert | |
| 5,976,401 A | 11/1999 | Suzuki | |
| 6,277,274 B1 | 8/2001 | Coffman | |
| 6,406,627 B1 | 6/2002 | Wallace | |
| 6,468,942 B1 | 10/2002 | Sansalone | |
| 6,537,340 B1 | 3/2003 | Hershberger | |
| 6,558,555 B1 | 5/2003 | Flowers | |
| 6,569,321 B2 | 5/2003 | Coffman | |
| 6,582,156 B1 | 6/2003 | Flowers | |
| 6,620,321 B2 | 9/2003 | Festa | |

(Continued)

FOREIGN PATENT DOCUMENTS

JP 02-119992 A * 5/1990

OTHER PUBLICATIONS

Bolan, N.S. et al., "A Critical Review on the Role of Mycorrhizal Fungi in the Uptake of Phosphorus by Plants," Plant and Soil, 1991, vol. 134, pp. 189-207.

(Continued)

Primary Examiner—Fred Prince
(74) Attorney, Agent, or Firm—Stroock & Stroock & Lavan LLP

(57) ABSTRACT

A bioretention system and method are provided for removing phosphorus, nitrogen and other materials from effluent such as wastewater and stormwater. The system and method can include a filtration media comprising water treatment residuals and other fill such as soil. Plants can be growing in the soil. The system can also include a drainage system to regulate outflow, to function during both low and high throughputs of water.

20 Claims, 8 Drawing Sheets

U.S. PATENT DOCUMENTS

| | | | |
|---|---|---|---|
| 6,623,642 | B2 | 9/2003 | Robertson |
| 6,652,743 | B2 | 11/2003 | Wallace |
| 6,712,969 | B2 | 3/2004 | Madrid |
| 6,814,871 | B1 | 11/2004 | Bem |
| 6,830,688 | B2 | 12/2004 | Austin |
| 6,896,805 | B2 | 5/2005 | Austin |
| 6,923,917 | B1 | 8/2005 | Hughes |
| 7,077,963 | B2 | 7/2006 | McConchie |
| 7,087,169 | B2 | 8/2006 | Austin |
| 7,232,278 | B1 | 6/2007 | Danehy |
| 7,294,275 | B1 | 11/2007 | Sibrell |
| 7,320,752 | B2 | 1/2008 | Austin |
| 7,341,661 | B2 | 3/2008 | Sansalone |
| 2002/0179509 | A1 | 12/2002 | Wofford |
| 2006/0151387 | A1* | 7/2006 | Yost et al. .................... 210/605 |
| 2007/0256966 | A1 | 11/2007 | Siviter |

OTHER PUBLICATIONS

Davis, A. P. et al., "Laboratory Study of Biological Retention for Urban Stormwater Management," Water Environment Research, 2001, vol. 73, No. 1, pp. 5-14.

Davis, A.P. et al., "Water Quality Improvement Through Bioretention Media: Nitrogen and Phosphorus Removal," Water Environment Research, 2006, vol. 78, No. 3, pp. 284-293.

Dietz, M.E. et al., "A Field Evaluation of Rain Garden Flow and Pollutant Treatment," Water, Air, and Soil Pollution, 2005, vol. 167, pp. 123-138.

Erickson, A.J. et al., "Enhanced Sand Filtration For Storm Water Phosphorus Removal," Journal of Environmental Engineering, 2007, pp. 485-497.

Henderson, C., "Removal of Dissolved Nitrogen, Phosphorus and Carbon From Stormwater by Biofiltration Mesocosms," Water Science & Technology, 2007, vol. 55, No. 4, pp. 183-191.

Hsieh, C.H. et al., "Bioretention Column Studies of Phosphorus Removal From Urban Stormwater Runoff," Water Environment Research, 2007, vol. 79, No. 2, pp. 177-184.

Hsieh, C.H. et al., "Evaluation and Optimization of Bioretention Media for Treatment of Urban Storm Water Runoff," Journal of Environmental Engineering, 2005, pp. 1521-1531.

Hsieh, C. H. et al., "Multiple-Event Study of Bioretention for Treatment of Urban Storm Water Runoff," Water Science and Technology, 2006, vol. 51, No. 3-4, pp. 177-181.

Hunt, W.F. et al., "Evaluating Bioretention Hydrology and Nutrient Removal at Three Field Sites in North Carolina," Journal of Irrigation and Drainage Engineering, 2006, pp. 600-608.

Johansson, L., "Blast Furnace Slag as Phosphorus Sorbents—Column Studies," The Science of Total Environment, 1999, vol. 229, pp. 89-97.

Sovik, A.K. et al., "Phosphorus Retention Processes in Shell Sand Filter Systems Treating Municipal Wastewater," Ecological Engineering, 2005, vol. 25, pp. 168-182.

Van Tichelen, K. K., "Kinetics of Phosphate Absorption by Mycorrhizal and Non-Mycorrhizal Scots Pine Seedlings," Physiologia Plantarum, 2000, vol. 110, pp. 96-103.

Westholm, L. J., "Substrates for Phosphorus Removal—Potential Benefits for On-Site Wastewater Treatment?" Water Research, 2005, vol. 40, pp. 23-36.

Y. Q. Zhao, "Use of dewatered alum sludge as a substrate in reed bed treatment systems for wastewater treatment", Journal of Environmental Science and Health, Part A, 2008, pp. 105-110, vol. 43, Taylor & Francis Group, LLC.

Y. Q. Zhao, "Use of dewatered alum sludge as main substrate in treatment reed bed receiving agricultural wastewater: Long-term trial", Bioresource Technology, 2009, pp. 644-648, vol. 100, Elsevier Ltd.

Y. Q. Zhao, "Alum sludge-based constructed wetland: An innovative and cost-effective system for wastewater treatment", 11th International Conference on Wetland Systems for Water Pollution Control, Nov. 1-7, 2008, Indore, India.

M. Razali, "Effectiveness of a drinking-water treatement sludge in removing difference phosphorus species from aqueous solution", Separation and Purification Technology, 2007, pp. 300-306, vol. 55, Elsevier B.V.

A.O. Babatunde, "Reuse of dewatered aluminium-coagulated water treatment residual to immobilize phosphorus: Batch and column trials using a condensed phosphate", Chemical Engineering Journal, 2008, pp. 108-115, vol. 136, Elsevier B.V.

A.O. Babatunde, "Testing and evaluation of a tidal flow alum sludge based contructed wetland system", 11th International Conference on Wetland Systems for Water Pollution Control, Nov. 1-7, 2008, Indore India.

William C. Lucas, "Nutrient Retention in Vegetated and Nonvegetated bioretention Mesocosms", Journal of Irrigation and Drainage Engineering, Sep./Oct. 2008, pp. 613-623, ASCE.

International Search Report Issued by Lee W. Young, May 20, 2009, PCT/US09/40844.

* cited by examiner (a)  (b)

a)          b)

BIORETENTION SYSTEM AND METHOD

CROSS REFERENCE TO RELATED APPLICATIONS

This application claims the benefit of U.S. Provisional Patent Application Ser. No. 61/045,506, filed Apr. 16, 2008, titled "BIORETENTION SYSTEM AND METHOD," and also Ser. No. 61/149,175, filed Feb. 2, 2009. The entire contents of these are incorporated herein by reference.

BACKGROUND OF THE INVENTION

The invention relates generally to a system for treating effluent containing particulate and dissolved pollutants. More specifically, the invention relates to a system and method for removing excess phosphorous (P) and nitrogen (N), such as dissolved P and N in the form of P or N compounds and ions, from stormwater and other polluted wastewater effluent. The invention also relates to improved media for long-term phosphorus retention in bioretention systems and an improved outlet for promoting nitrogen retention.

Bioretention systems often include a basin to contain the effluent to be treated. The bottom of the basin is commonly composed of a porous media that is planted with vegetation. As the effluent passes through the bioretention system, particulate pollutants are removed by filtration. Dissolved phosphorus can be removed from the effluent by biological processes of the system such as vegetative and microbial biomass uptake, as well as chemical adsorption/precipitation processes (herein referred to under the category of sorption), which are effected by properties of the media. Dissolved nitrogen can also be removed from the effluent by vegetative and microbial biomass uptake, as well as biological transformations, including denitrification, that eventually convert nitrogen into nitrogen gas.

Bioretention systems have been documented as being cost-effective effluent management facilities for stormwater runoff in terms of removing sediments and sediment bound phosphorus and nitrogen. This can be particularly relevant in watersheds that have been impacted by urban and/or agricultural runoff to such an extent that they are the subject of what are referred to as Total Maximum Daily Load (TMDL) criteria for nutrients. However, typical bioretention systems with sandy media and free discharge outlets are less effective for dissolved nitrogen and long term dissolved phosphorus removal. Methods to increase retention of nutrient pollutants to meet TMDL criteria can be important in the design of effluent management facilities, so they can more effectively process effluent in a more acceptable and efficient manner.

Accordingly, there is a need for improved bioretention systems and methods and for improved media to be used in bioretention systems.

SUMMARY OF THE INVENTION

A bioretention system and method are provided for removing phosphorus and nitrogen from effluent such as wastewater and stormwater. The system and method can include a filtration media having a coarse-textured matrix of preferably well graded sand with a low uniformity coefficient, blended with organic material resistant to decomposition, such as peat moss, blended together with a fine fraction of clay-like material amendment having a high phosphorous sorption capacity. The coarse matrix fraction can vary from about 50 to 80% by volume. The organic material can vary from about 10 to 20% by volume, and the fine fraction amendment can vary from about 10% to 40% by volume. The coarse fraction component can include materials crushed to sand particle gradation, preferably U.S. Golf Association (USGA) root zone gradation of which at least 60% is between a diameter of ⅕₂₅ inch and 1/100 inch, no more than 10% should be greater than ⅕₂₅ inch. No more than 5% should be less than 1/500 inch. Examples of preferable materials include crushed limestone, iron-coated sand, neutralized residue sand from bauxite processing, crushed brick, etc. The organic component can include coir (coconut husk), peat or peat moss. The fine material amendment can include aluminum- or iron-based water treatment residuals (WTRs), seawater neutralized red mud byproduct from processing bauxite into aluminum, red gypsum byproduct from processing rutile into titanium, or iron and aluminum rich native soils, with WTR's preferred for many applications.

The system can also include an outlet system having a lower outlet, a pipe extending upward from proximate the lower outlet, and an upper outlet connected to an upper distal end of the pipe. The outlets preferably extend residence time for improved nitrogen removal in the small water treatment events, which comprise the majority of annual runoff volumes. These outlets preferably also permit high flows in larger water treatment events to pass through the media, thus permitting the systems to treat even substantial events with minimal bypass flow left untreated.

The system can further include grasses, trees, bushes and/or or shrubs provided in an amount sufficient to improve biological uptake and transformations, as well as media infiltration properties.

The system can also provide the media, stone and outlet system within a unitary structure. The system can further include a tree, bush or shrub and/or grasses. These should be in sufficient amounts to improve the filtration properties and/or prevent surface erosion. Preferably, a grate is provided above the media to protect the media from the weight of persons, animals and objects passing above it. The grate preferably includes one or more apertures to permit water to enter and gases to escape.

Other objects and features of the present invention will become apparent from the following detailed description, considered in conjunction with the accompanying drawing figures. It is to be understood, however, that the drawings are designed solely for the purpose of illustration and not as a definition of the limits of the invention, for which reference should be made to the appended claims.

BRIEF DESCRIPTION OF THE DRAWINGS

The particular features and advantages of the invention as well as other objects will become apparent from the following description, taken in connection with the accompanying drawings, in which.

DESCRIPTION OF PREFERRED EMBODIMENTS

Figure 1:
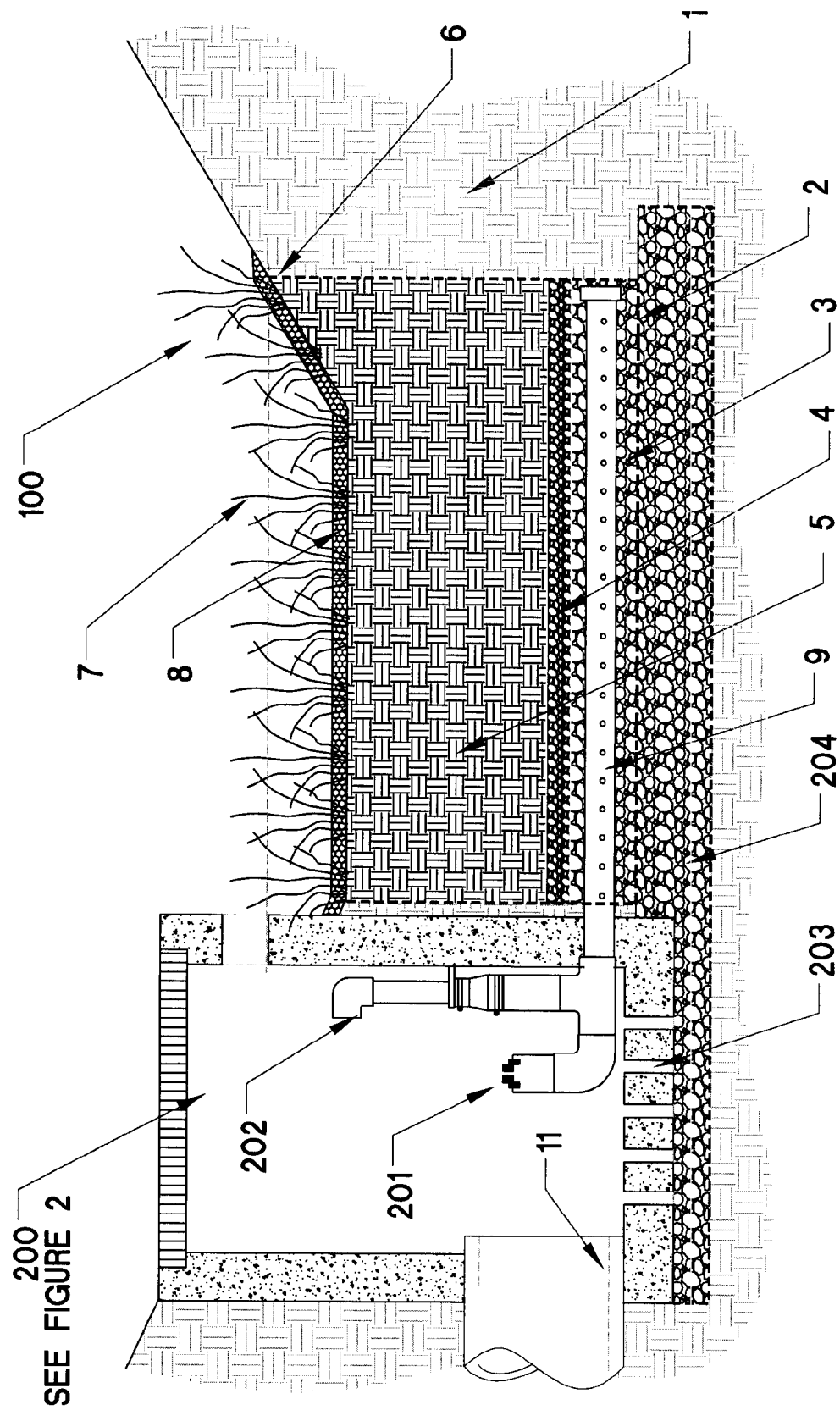
FIG. 1 is a front sectional view of a bioretention system in accordance with an embodiment of the invention.

The invention is directed to a bioretention system and method for removing phosphorus, nitrogen and other contaminants from fluid effluent, such as wastewater and stormwater streams. The system and method can include layers of filtration media. Some of the media can have a coarse-textured matrix of preferably well graded sand with a low uniformity coefficient. This can be layered or blended with organic material resistant to decomposition, such as peat moss and/or a fine fraction of clay-like material amendment, such as one having a high phosphorous sorption capacity. The coarse matrix fraction can vary from about 50 to 80% by volume. The organic material can vary from about 10 to 20% by volume. The fine fraction amendment can vary from about 10% to 40% by volume.

The coarse fraction component can include materials crushed to sand particle gradation, preferably U.S. Golf Association (USGA) root zone gradation of which at least 60% is between a diameter of 1/25 inch and 1/100 inch, no more than 10% should be greater than 1/25 inch. No more than 5% should be less than 1/500 inch for most expected applications. Examples of preferable materials include crushed limestone, iron-coated sand, neutralized residue sand from bauxite processing, crushed brick, etc. The organic component can include coir (coconut husk), peat or peat moss.

Preferred filtration media, included, for example as a fine material amendment, can include aluminum- or iron-based water treatment residuals (WTRs), seawater neutralized red mud byproduct from processing bauxite into aluminum, red gypsum byproduct from processing rutile into titanium, or iron and aluminum rich native soils. All of these materials are characterized as having a very low phosphorus saturation index (PSI), in which lower values represent high phosphorus sorption capacity.

Water Treatment Residuals (WTRs) are commonly used in drinking water treatment plants and can include the material both in its fresh or aged form. The aged form is preferred for many applications. They can include the residues resulting from coagulating dissolved organic acids and mineral colloids with either aluminum or iron sulfate. Comprising clay, organic matter and the original metals, these materials are typically very fine textured and are very resistant to air drying when fresh. Once dry, they form brittle cohesive hydrophobic aggregates. After a period of exposure to weathering, the WTRs become less brittle and hydrophobic and easier to blend.

Iron sulfate generates ferrihydrite-WTRs ($Fe_5O_7(OH) \cdot 4H_2O$) in which the adsorption processes require acidic conditions; so the P-sorption capabilities of ferric WTR are much more pronounced in acidic soils. The effect of ferrihydrite can be 50 times as great at a pH below 6.0, compared to alkaline soils above pH 8.0. Calcitic lime can be added to soils in which the addition of ferric WTR results in a pH below 6.0. Ferrihydrite application can increase P-adsorption and retention in typical field soils.

Alum-based WTRs are dominated by extensive proportions of aluminum hydroxides, often exceeding 25%, of which a substantial proportion is in the most effective amorphous form. There can also be considerable quantities of iron compounds as well as minor proportions of calcium, magnesium and other elements. The PSI of alum-based WTRs can vary from 0.37 to 6.34, with a mean of 2.10. Functioning effectively at neutral pH, alum-based WTRs can be effective in reducing the interstitial dissolved P concentrations in highly P-enriched soils. A 6% application can significantly reduce dissolved P concentrations below the threshold for P desorption. High rates of WTR applications to P enriched soils can reduce runoff dissolved P losses significantly and improve dissolved P retention by incorporating alum-based WTRs into soils. Increasing amorphous aluminum content in substrates can be correlated with lower dissolved P concentrations.

WTRs can have maximum P adsorption capacities ranging from about 6.6 to about 16.5 g/kg after 17 hr equilibration. When aggregates are crushed from about 2 mm to about 150 μm, the mean values can increase to about 9.68 g/kg. Equilibrated for six days, the mean value can increase to about 22.9 g/kg, an order of magnitude greater than the initial value. Most of this equilibration can occur within the first two days, demonstrating the effect of surface area and time. After maximal uptake, less than about 10% of the adsorbed P can be desorbed, indicating that the adsorption processes are irreversible.

Intrapore diffusion within the particles has been reported and is an integral aspect of the irreversibility of sorption by WTRs. The intrapore specific surface area is 24 times that of the average particle size. Accelerated aging by multiple wet dry cycles accelerates internal diffusion to locations where the P is irreversibly bound.

It has been determined that WTRs are very effective in retaining dissolved P even after extensive amounts of P have been sorbed. Dissolved P concentrations of water passing through the WTRs remain very low even after sorbing amounts that would result in high dissolved P concentrations from other materials typically used in bioretention media.

Red mud is a by-product of refining bauxite into aluminum. In the Bayer process, caustic sodium is added to dissolve the alumina from the crystalline mineral matrix under high temperature and pressure. The resulting solution is then separated and clarified, after which it is calcined to separate the alumina from the solution. Red mud commonly comprises the finer fraction of the original bauxite left after this process.

Red muds are characterized by extensive proportions of secondary minerals. The highly alkaline sodium hydroxides and sodium carbonates result in pH values ranging from about 9.75 to about 12.56. Iron minerals comprise hematite ($FeO_2$), a crystalline iron oxide, and usually goethite ($FeO(OH)$), which is more amorphous and better capable of P sorption. The aluminum minerals gibbsite ($Al(OH)_3$) and boehmite ($\gamma$-$AlOOH$) are also very abundant in most red mud. The proportions of amorphous iron and aluminum range from about 0.05% to about 022%, and about 0.93% to about 5.02%, respectively. There can be considerable quantities of calcite (CaO), but this can vary widely. The resistant primary minerals include quartz, zircon and ilmenite (TiO) and comprise a relatively small proportion ranging from about 6% to about 24%. There can also be minor amounts of heavy metals and radionuclides, most of which are in very stable forms. Depending upon the source and process, red muds can differ considerably in terms of mineralogical composition, and often within the same deposit. Therefore, the mineral composition of red mud will always vary.

Red muds are very effective in retaining dissolved P even after extensive amounts of P have been sorbed. Dissolved P concentrations of water passing through the red muds remain very low even after sorbing amounts that would result in high dissolved P concentrations from other materials typically used in bioretention media.

Iron and aluminum rich mineral soils such as Krasnozem soils derived from basalt are also very effective in retaining phosphorus. Compared to most soils, these soils contain a high proportion of amorphous aluminum and iron. Krasnozem soils are known for retaining phosphorus.

Krasnozem soils are very effective in retaining dissolved P even after extensive amounts of P have been sorbed. Dissolved P concentrations of water passing through the red muds remain very low even after sorbing amounts that would result in high dissolved P concentrations from other materials typically used in bioretention media.

Unlike P retention, which is understood to be a chemical process of sorption to media, nitrogen retention is a biological process that can be ultimately driven by photosynthetic output from plants. Plants not only take up nitrogen directly, they release carbon compounds into the soil which is consumed by microbial activity which can also take up nitrogen, as well as transforming some of the nitrogen into nitrogen gas, which is lost from the system. These N removal processes are promoted by increases in retention time and saturated conditions.

Systems and methods in accordance with the invention can also include a drainage system which preferably has an outlet control system that can be adaptively managed to control retention time, saturation and surface ponding over the layers of filtration media in response to changes in media and soil properties over time. The drainage system can include an outlet system having a lower outlet, a pipe extending upward from the lower outlet, and an upper outlet connected to an upper end of the pipe. The outlets preferably extend residence time for improved nitrogen removal in the small water treatment events, which comprise the majority of annual runoff volumes. These outlets preferably also permit high flows to pass through the media in larger water treatment events, thus permitting the systems to treat even substantial events with minimal bypass flow left untreated. Controlling flow through the drainage system can also affect phosphorus removal.

The system can also provide the media, stone and outlet system within a unitary structure. The system can further including a tree, bush or shrub, as well as grasses. Preferably, a grate is provided above the media to protect the media from the weight of persons, animals and objects passing above it. The grate preferably includes one or more apertures to permit water to enter and gases to escape.

Certain preferred embodiments of the present invention will now be described with reference to the drawings. Referring to FIGS. 1-4, a bioretention water treatment system 100 can be placed within, preferably in contact with an existing plot of soil 1. System 100 preferably includes a layer of media 5, preferably positioned above a choker layer 4, which is preferably above a stone layer 3, preferably comprising underdrain stones. An underdrain 9 is preferably positioned within underdrain stone layer 3. A soil retention material, such as a layer of drainage geotextile 2 can be included to prevent soil 1 surrounding the system from migrating into media 5 and underdrain stone layer 3.

In accordance with an embodiment of the invention, media 5 can comprise a coarse matrix, also referred to as a coarse fraction. It can also comprise an organic component, also referred to as an organic fraction. Media 5 can also include fine material amendments that preferably have a high phosphorus sorption capacity. Preferably, media 5 includes about 50% to about 80% by volume of the coarse fraction component, about 10% to about 20% by volume of the organic component, and about 10% to about 40% by volume of the fine material amendment component. The organic and fine amendments may be provided to improve soil conditions. For example, they can improve soil water retention and add trace element micronutrients. The coarse fraction, organic fraction and fine amendment materials can be blended with a screening plant or other mechanical device.

The coarse fraction can include turf grade sand with a low uniformity coefficient, which preferably promotes infiltration. Other preferred examples of the coarse fraction include any or all of, without limitation, sand derived from crushed limestone, iron-coated sand derived from areas with high iron content, neutralized residue sand from bauxite processing, and/or crushed brick.

The organic component preferably includes coir (coconut husk) peat, which preferably include coarse fibers in addition to the finely ground crushed husk. Other preferred examples of the organic component include, without limitation, peat moss. Compost, aged wood chips and mulches can also be present. Preferably, the organic fraction promotes water retention and improves infiltration rates.

The fine material amendment preferably includes a material that has a high phosphorus sorption capacity and high specific surface area (surface to volume ratio). A preferred example of the fine material is an alum-based water treatment residual (WTR), which can be a waste product of the water treatment industry. It has been determined that alum-based WTRs preferably continue to retain over 95% of phosphorus applied at stormwater concentrations, even after nearly a decade of stormwater loads when typical sandy loam systems have become ineffective. Other preferred examples of the fine materials include, without limitation, iron-based WTRs and/or limestone-based WTRs.

Another example of the preferred fine material includes red mud, a fine clay-sized material remaining after extracting aluminum from bauxite ores. Because it can be highly alkaline, it is preferably neutralized to reduce its alkalinity. Seawater neutralized red mud by product from processing bauxite into aluminum can be effective. It has been determined that media with red mud can retain over 85% of phosphorus applied at stormwater concentrations, even after well over a decade's worth of stormwater loads.

Another example of the preferred fine material includes red gypsum, a fine clay-sized material remaining after extracting titanium from rutile ores. Red gypsum has been demonstrated to have a very high affinity to retain phosphorus applied at stormwater concentrations.

Another example of the fine material includes native soils, particularly those that are high in iron and/or aluminum content. It has been determined that media with Krasnozem soils high in iron content can retain over 70% of phosphorus applied at stormwater concentrations even after over a decade of stormwater loads.

The fine material can be equally proportioned between the fine materials and coarser aggregates of fine materials. As the fine media ages, the coarse fragments may become dispersed, providing more P retention capability as the systems matures.

In accordance with an embodiment of the invention, land can be prepared by excavation and/or filling to a depth sufficient to place a layer of media 5 and underdrain stone 3, while allowing for storage of effluent in surface ponding when inflow rates exceed the infiltration rate of the media. Preferably, geotextile 2 retains media 5 and underdrain stone 3 and divides media 5 and underdrain stone 3 from the soil 1 on one side of geotextile 2 and the soil 1 on the other side of geotextile 2. The geotextile material is preferably porous to permit media 5 and stone layer 3 to drain into the soil. In settings where both total nitrogen (TN) loads and the infiltration rate of the native soils are high, the geotextile can be made substantially impermeable so as to prevent the exfiltration of nitrogen into the groundwater.

The stone layer is preferably at least five inches, more preferably over about six inches deep. It preferably comprises an aggregate, preferably an open-graded No. 4 crushed aggregate, wherein the median diameter is about 1.0 (or about 0.8 to about 1.2) inches. The aggregate is preferably washed, more preferably with water, to rinse out the fines that can accumulate during the crushing process. Choker layer 4 can be about two inches to about four inches, preferably three inches deep and preferably also includes an aggregate, more preferably a No. 89 mixed aggregate wherein the median diameter is about 0.25 (or about 0.2 to about 0.3) inches. Such an aggregate preferably facilitates limiting the migration of media 5 down into underdrain stone layer 3.

Preferably, media 5 is at least about 15 inches to about 36 inches, preferably about 18 inches deep. In areas of concentrated phosphorus loads, the media depth and amendment proportion can be increased to provide more sorption capacity. To utilize more media 5 for better treatment performance, the depth of the media can be increased along the sides, preferably to the depth of typical ponding 6.

An example of the method of installing the system in accordance with an embodiment of the invention will be described herein. Upon preparing the site by excavation and filling, geotextile 2 can be placed within the excavated subgrade to line substantially all of the exposed surface of the prepared area. Therefore geotextile 2 can provide a base and walls extending upward from the base. Part of stone layer 3 can be positioned on this base. Underdrain 9 can be installed within stone layer 3. Choker layer 4 can be placed over underdrain stone layer 3 with underdrain 9 within stone layer 3. Subsequently, media 5 can be placed over choker layer 4, preferably without using wheeled or tracked equipment that would compress it. Media 5 is preferably permitted to settle about 15% to about 25%, preferably about 20%, until media 5 has the desired depth. Media 5 is preferably wetted by enough rainfall or irrigation to induce settlement of at least about 10% to about 15%, preferably about 15% before planting of one or more of a plant material 7.

Following initial settlement, plant material 7 can be added to the system to enhance phosphorus and nitrogen removal processes, as well as maintaining infiltration rates as sediments accumulate. Preferably, plants 7 comprise a mixture of cold-season C3 and warm-season C4 grasses adapted to the hydrologic regime of the site. In particular, the C4 grasses *Pennesetum alopecuroides* (Fountain grass) and *Panicum virgatum* (Switch grass) have been determined to be effective in promoting nutrient retention in bioretention settings. As an alternative, woody shrubs, bushes and small trees adapted to the hydrologic regime can also be used for the plant material. Such plants are preferably shallow rooted to prevent windthrow. Moreover, any combination of grasses, forbs, shrubs and trees can be provided depending on the setting, without deviating from the scope of the invention.

A surface layer of mulch 8 can be deposited after planting plant material 7. Mulch 8 can prevent surface compaction by raindrop impact, scour from surface inflows, and excessive drying and cracking. One embodiment of the invention uses for this purpose, several inches of fine well-graded gravel, wherein the median diameter is about 0.20 inches to about 0.30 inches, preferably about 0.25 inches. Another example of mulch layer 8, which preferably provides better reduction of surface clogging and more sorption of metal cations, is well-aged hardwood mulch, which intercepts much of the suspended sediments in the effluent. This can facilitate removal of accumulated sediments as part of a periodic mulch replacement process.

The selection of the mulch can be dependent on plant material 8. In installations wherein the plant material includes grass, the preferred mulch can include gravel. Since grass can spread, its litterfall can provide its own organic mulch, and the high stem density of grass can improve infiltration rates when sediments accumulate. With shrubs and trees, the lower stem density may be less effective in preventing clogging, while permitting ease of mulch replacement. In this planting embodiment, hardwood mulch can be preferred.

Flows treated by passing through media 5 can enter underdrain stone layer 3. Accordingly, an outlet system can be provided, comprising one or more underdrains 9, such as a perforated or slotted pipe, preferably having a diameter of about two to about eight inches, spaced at regular intervals, preferably about 30 feet apart or less. Larger pipe and deeper stone depths can be preferred when underdrains 9 are longer. In larger systems, the underdrains can be connected by a manifold. The underdrain (or manifold) can be connected to an outlet system, such that a fluid can flow from within the underdrain 9 into the outlet system.

In areas where N retention is important and soils are very permeable, it is likely that water would flow through the permeable geotextile 2 into soil 1 too fast for effective N retention. Because water bypasses the outlet and flows directly into soil 1, the lower outlet may not control flows into the soil 1. Accordingly, geotextile 2 can be made substantially impermeable to ensure that all flows are directed through the outlet, so they can be controlled by the characteristics of the outlet. The elevation of the outlet pipe 11 can be raised above the holes 203 so treated water can then preferentially leave the outlet assembly through holes 203, and pass into a stone layer 204, located under impermeable membrane 2. In this manner, only fully treated water can then infiltrate into the soil.

In accordance with an exemplary embodiment of the invention having the configuration shown in FIG. 1, effluent can enter media 5 through mulch 8. As it passes through media 5, phosphorous can be adsorbed from the effluent. Preferably, the filtered effluent can enter underdrain 9 and flow into outlet system 200 and into box 10, then into drainage pipe 11. Outlet system 200 preferably controls the rate at which the effluent passes through media 5 to enhance filtration, adsorption, and transformation. For example, more nitrogen may be removed from the effluent if the effluent is retained in media 5 for a longer period of time. By providing two or more outlets within the box, outlet system 200 can provide increased flow of the effluent from underdrain 9 into the box 10. Whereas two outlets are illustrated, it is to be understood that the number of outlets can vary as a matter of application specific design choice.

Figure 2:
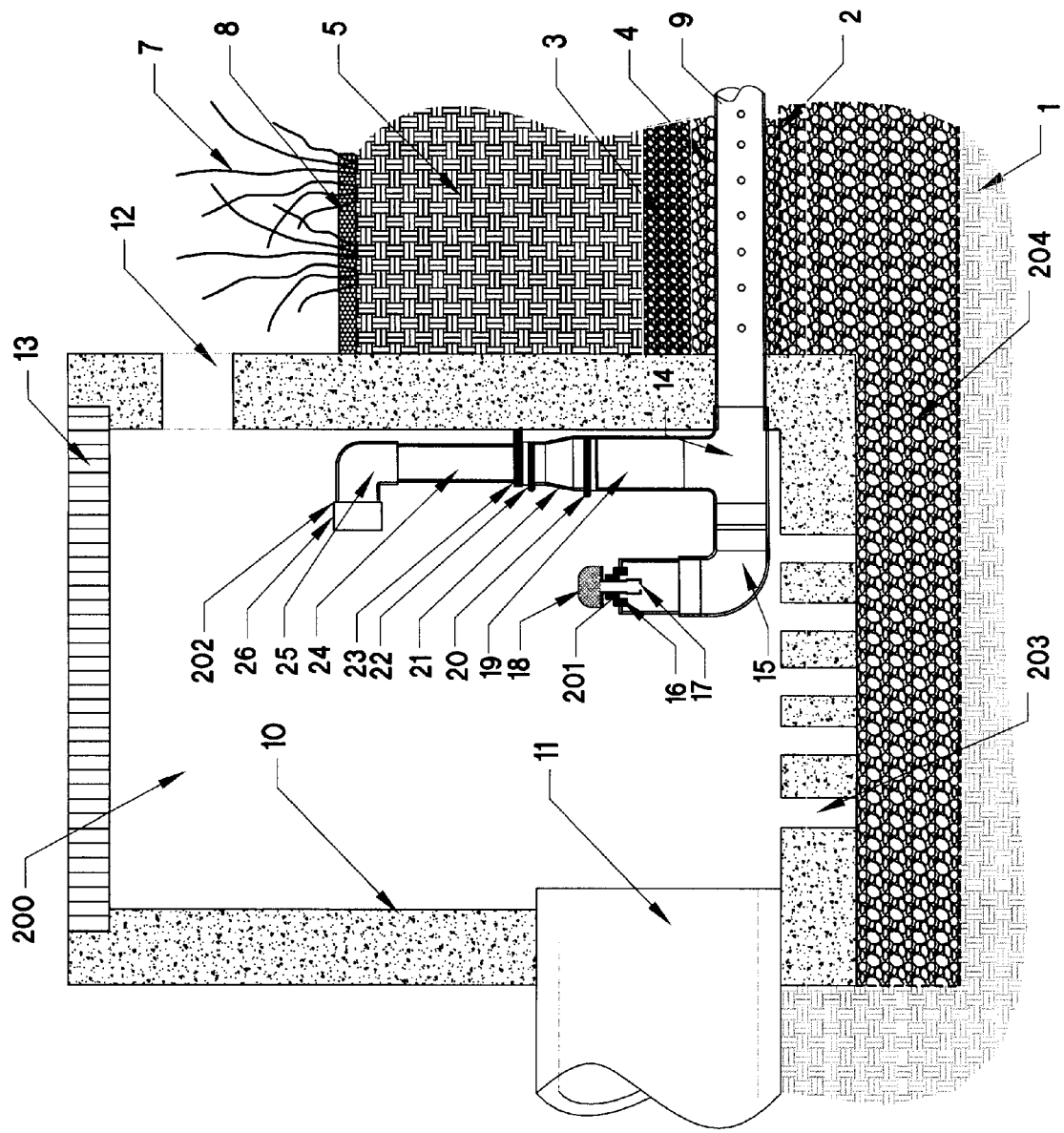
FIG. 2 is a front sectional view of an outlet system in accordance with an embodiment of the invention.

An outlet system 200 in accordance with an embodiment of the invention is shown in FIG. 2. The media can have high infiltration rates. Under certain conditions, a system without a controlled outlet system can provide retention times within the media of an hour or less. This retention time can be too short for time-dependent nitrogen transformations such as denitrification to occur effectively. The outlet system preferably provides for controlling out flows to a rate that is a fraction of the media infiltration rate, thus extending the duration of retention within the media. The effective outflow rates can preferably be adjusted to provide the desired retention time for promoting nitrogen transformations as selected. Providing a low flow control structure can increase the retention time to, for example, over six hours, while having minimal effect upon surface ponding depths. The outlet system preferably also extends the duration of saturated conditions to over about six hours, about twelve hours or up to a day or more, thus promoting enhanced denitrification.

Referring to FIG. 2, the arrangement of system 200 can permit the outflow rate to be increased where prevailing rainfall is more intense, or where the ratio between source area and facility size is higher. Alternatively, where infiltration rates in the native soils are high, the low flow outlet may be restricted. The outlet can also preferably be adjusted to respond to changes in conditions over time.

Outlet system 200 can include a pre-formed box, such as a concrete box 10, preferably dimensioned to correspond to standard street inlets. Box 10 is drained by an outlet pipe 11, which can be sized according to standard routing procedures familiar to those customarily skilled in the art. Outlet system 200 can include one or more intermediate flow outlets 12 on the side, with a grate 13 proximate the top of box 10 to convey large flow events, all preferably sized according to standard routing procedures familiar to those customarily skilled in the art. Outlet 12 is preferably about 6 inches to about 24 inches, more preferably about 9 inches to about 12 inches above the surface of mulch layer 8.

Underdrain 9 (or manifold) can pass through box 10 and terminate in a tee 14. A swiveling elbow 15 with reducing bushing and nipple assembly 16 can be provided at the other end of tee 14 and can be terminated by an end cap preferably having an orifice 17. Orifice 17 is preferably adjustable to intermediate issues by drilling its center bushing with a specific drill size.

Taking into account infiltration into the native soils and the desire to provide a saturated zone, the size and elevation of, orifice 17 can be preferably precisely designed by those skilled in the art to provide a saturated zone and extend retention time within the media once the system has drained below the upper outlet discussed below. Orifice 17 can be prevented from clogging from surface flows by fastening a strainer 18 over nipple 16. Flows from underdrain 9 and exiting out the outlet can be preferably filtered by the media.

A lower riser pipe 19 can extend upward from tee 14, terminate at a flexible reducing fitting 21 and be fastened with a pipe clamp. An upper riser 24 can be sized such that it at least partially fits inside lower riser 19. Upper riser 24 can be preferable attached to reducing fitting 20 with a pipe clamp 22, which preferably facilitates adjustment of the exposed length of upper riser 24 and its outlet assembly discussed below. A loose fitting bracket 23 can be provided to maintain upper riser 24 attached to a wall of box 10, while permitting adjustments to its height as needed or solicited.

An upper outlet assembly preferably comprises an elbow 25 connected to upper riser 24, with an end cap 26 placed on elbow 25. End cap 26 can be drilled or cut to size the outlet designed for the particular installation. A strainer 26 can be preferably fastened over the end of nipple 25 to prevent nipple 25 from clogging.

End cap 26 can be preferably sized and its elevation can be established by those skilled in the art to optimize the ponding time and depth to detain as much runoff as possible while treating large events. In storm events at typical rainfall intensities, the surface can pond up above the elevation of outlet as high as 24 inches. This can cause the ponding depth to increase, thus causing a corresponding increase in effective head. As a result, the formerly low percolation rates controlled by lower outlet 201 can be supplemented by the flow through upper outlet 202, for example, according to Darcy's Law in a manner such that flow rates can be in many multiples of the normal low flow discharge rate. The benefit of having an adjustable elevation for upper outlet 202 can be that its elevation can be manipulated to respond to changes in infiltration rates in the media over time. As sediments accumulate and the saturated hydraulic conductivity decreases, the height of upper outlet 202 can be lowered to increase the effective head, thus maintaining effective infiltration responses. This can provide the capability for adaptive management to obtain the best performance based upon the stabilized characteristics of the media.

In areas where N retention is important and soils are very permeable, geotextile 2 can be made substantially impermeable to ensure that all flows are directed through the outlet, so they can be controlled by the characteristics of the outlet. Treated water can then leave the outlet assembly through holes 203, and pass into a stone layer 204, located under impermeable membrane 2. In this manner, only fully treated water can then infiltrate into the soil.

Outlet system 200 preferably provides a way to not only regulate small frequent flows to enhance nitrogen removal, but also to utilize the capability of the rapid infiltration rate of the media to treat transient high flows that contain particulate matter that still needs to be filtered. The ability to adjust the elevation and diameter of the orifices of outlet system 200 can permit systems in accordance with the invention to be responsive to changes in media infiltration rates or design discharge criteria. In combination with the improvements to the media sorption and infiltration response, the outlet configuration of embodiments of outlet systems 200 can improve nutrient retention compared to free discharge systems with media not in accordance with the invention.

Figure 3:
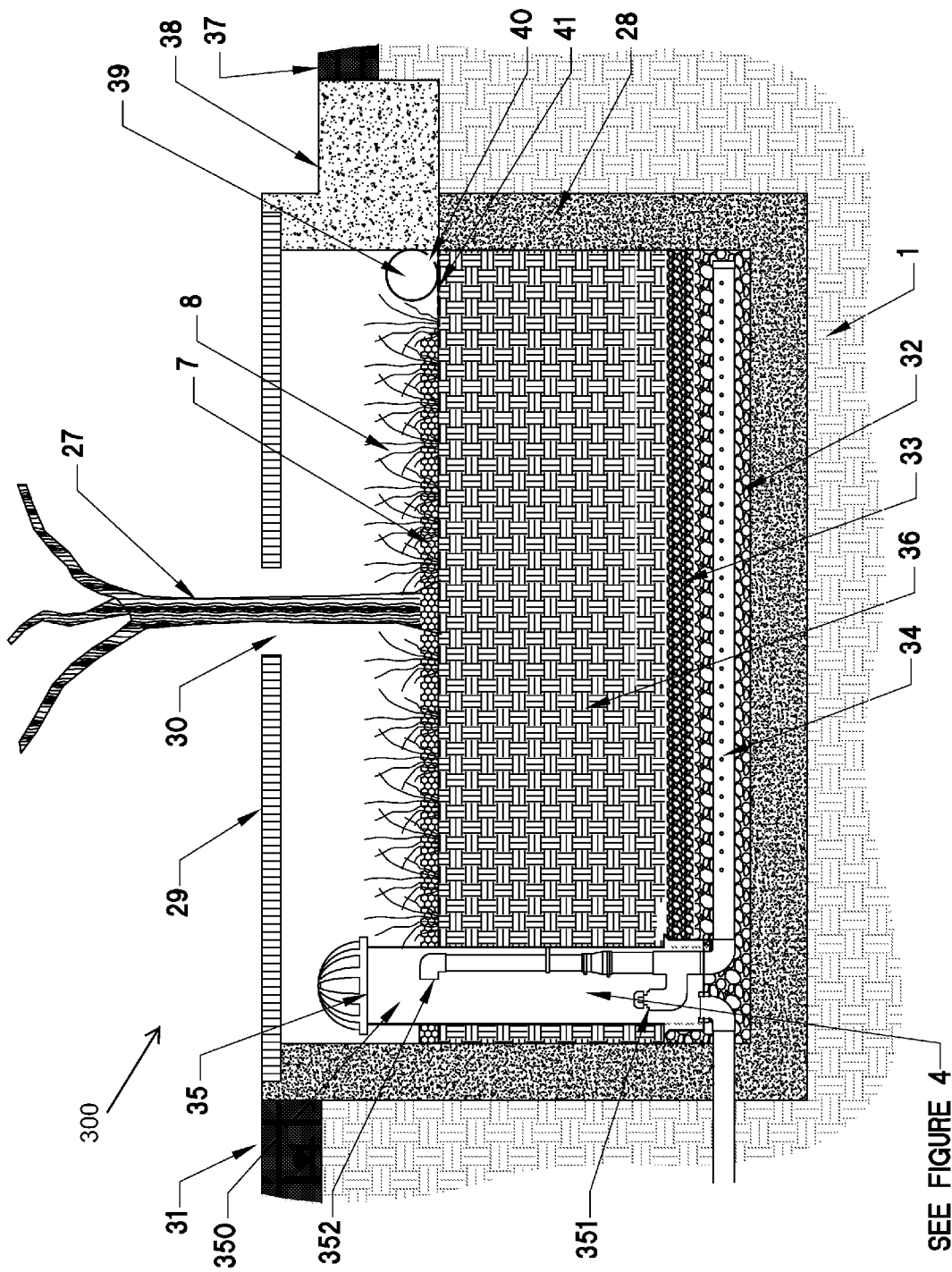
FIG. 3 is a front sectional view of a bioretention system in accordance with an embodiment of the invention.

A water treatment bioretention system 300 in accordance with another embodiment of the invention is shown in FIG. 3. Water treatment system 300 can include at least one tree or shrub 27. System 300 will be referred to hereafter as planter installation 300. Such an embodiment may be beneficial in locations wherein space is limited or confined, such as in urban settings. Referring to FIG. 3, the plant material of planter installation 300 can include a tree or shrub 27 adapted to the hydrologic regime. Trees and shrubs can provide more evapotranspiration for the same media area than grass, and can thus improve overall moisture retention. Examples of trees suitable for planter installation 300 include *Acer rubrum* (Red Maple), *Platanus acerifolia* (London Plane Tree) and *Quercus palustris* (Pin Oak). However, it is to be understood that other trees and shrubs can be used without deviating from the scope of the invention.

Surrounding the tree, a mixture of cold-season C3 and warm-season C4 grass can be provided. In accordance with a preferred embodiment of the invention, warm season grass C4 can include *Pennesetum alopecuroides* (Fountain grass) and/or *Panicum virgatum* (Switch grass), which inventors determined to be effective in promoting nutrient retention. In accordance with an embodiment of the invention, No. 4 stone or other loose ground cover can be placed surrounding the tree 27 to fill the structure. This preferably permits the entry of air and water, while preventing compaction of the water treatment media by foot traffic. The arrangement having No. 4 stone can be less expensive, but it can also be less effective for nutrient removal and can provide less surface ponding volume.

Referring to FIG. 3, native soil 1 can be preferably isolated from the media by a high-permeability porous concrete structure 28 which preferably keeps surrounding soils from migrating into the media and stone, while permitting the media and stone to slowly drain into the soils. The structure can be covered by a grate 29 with openings small enough to permit ease of walking traffic, yet large enough to permit unimpeded entry of air and water. Grate 29 can preferably also have an opening 30 for the tree to extend therethrough. Preferably, grate 29 can be set flush to a sidewalk 31. Grate 29, as illustrated, may be particularly beneficial for a system which does not include stones surrounding tree 27.

A stone layer 32 can be preferably at least about three inches, more preferably about four inches deep, and can preferably include an open-graded No. 4 crushed aggregate wherein the median diameter is about 0.8 inches to about 1.2 inches, preferably about 1.0 inches. The aggregate can be preferably washed with enough water to rinse out the fines accumulated during the crushing process. The aggregate can be covered by a choker layer 33 preferably about 1.5 inches to about 2.5 inches, preferably about 2 inches deep. Choker layer 33 can preferably include No. 89 mixed aggregate wherein the median diameter is about 0.2 inches to about 0.3 inches, preferably about 0.25 inches, which can limit migration of the media down into stone layer 32. Stone layer 32 can be preferably drained by a perforated underdrain 34 having at least about one inch, more preferably about two inches in diameter, which can be connected to an outlet system 350 in an overflow standpipe 35, discussed in more detail below and depicted in more detail in FIG. 4.

A layer of media 36 can be placed over choker layer 32, preferably without using wheeled or tracked equipment that may compress the media. The depth of the media can be preferably at least about 18 inches, preferably about 24 inches, after allowing for about 20% settlement. In areas of concentrated phosphorus loads, the depth of media 36 and amendment composition and proportion can be manipulated to provide more sorption capacity in accordance with the particular requirements of the site.

Inflows from a street 37 can be collected by a highly permeable porous concrete curb section 38 sized to permit direct entry of polluted runoff while keeping coarse debris such as leaves and trash from clogging media 36. Alternatively, runoff can be collected by a standard curb inlet system located upstream of system 300. The most polluted "first flush" and low flows can be selectively diverted into a manifold system from an upstream inlet that is distributed by a pipe 39 having perforations or slots 40 therethrough. Perforations 40 can be preferably sized by those skilled in the art so as to distribute flows substantially equally among several planter units at different elevations. Underneath pipe 39 and/or adjacent to porous concrete inflow section 38, a non-biodegradable turf reinforcement matting 41 can be placed, to prevent erosion and scour from concentrated inflows.

Figure 4:
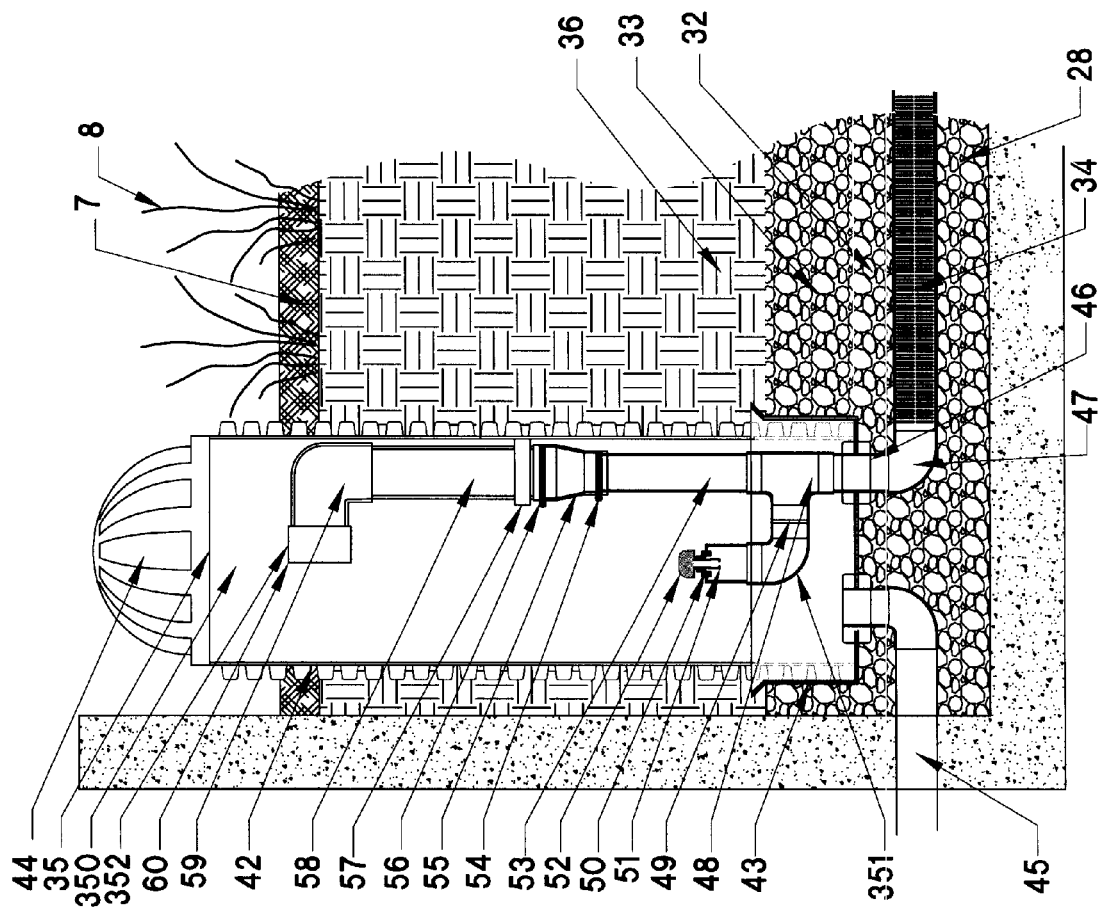
FIG. 4 is a front sectional view of an outlet system in accordance with an embodiment of the invention.

An outlet system 350, in accordance with an embodiment of the invention, having an upper outlet 352 and a lower outlet 351 is shown generally in FIG. 4. Outlet system 350 can include a riser pipe 42, preferably comprising plastic. Pipe 42 can preferably include a diameter of about 10 inches to about 18 inches, preferably 12 inches. The outlet can further include an end cap 43 sealed to prevent uncontrolled water loss. To convey overflows, runoff ponded at the surface can enter a top end 35 of pipe 42 through a grate 44 which can determine the overflow elevation of the standpipe. These flows can be preferably conveyed from system 300 by outlet pipe 45.

Inflows from underdrain 34 can pass through end cap 43 in a watertight bulkhead fitting 46. Underdrain 34 can preferably terminate in a bend 47, above which a tee 48 can be fastened. A swiveling elbow assembly 49 with reducing bushing and nipple assembly 50 can be provided at the other end of tee 48 and terminated by an orifice 51. Orifice 51 can be preferably adjustable to intermediate size by drilling the center bushing with a specific drill size, as applied to lower orifice 51.

A reducing bushing and nipple assembly 50 can be preferably positioned at the end of elbow assembly 49 and terminated by bushing assembly 50 which preferably includes an orifice 51. Taking into account infiltration into the native soils, and the opportunity for providing a saturated zone, the size and elevation of orifice 51 can be preferably designed by one skilled in the art to provide a saturated zone and to extend retention time within the media once the system has drained below an upper outlet 352 discussed below. Orifice 51 can be preferably prevented from clogging by providing a strainer 52 over the nipple, wherein the strainer can be preferably secured onto the nipple. Flows out of outlet 352 can be preferably already filtered by the media.

The lower outlet can be adjusted to respond to field infiltration rates. In permeable soils, it can be both constricted and/or raised, increasing the volume of treated water that is infiltrated. In poorly draining soils, the outlet can be expanded and/or lowered, thereby increasing the rate of flow while reducing the volume stored. In this manner, the response of the system can be tailored to conditions encountered in the field so as to provide consistent responses.

A lower riser pipe 53 can extend upward from tee 48 and terminate at a flexible reducing fitting 55, and can be preferably fastened with a pipe clamp 54. An upper riser 58 can be preferably constructed and arranged to fit at least partially inside lower riser 52. Upper riser 55 can be preferably attached to reducing fitting 53 with a pipe clamp 54. Pipe clamp 54 can preferably facilitate adjustment of the exposed length of upper riser 55. A loose fitting bracket 56 can be placed to fasten the upper riser 55 to the structure wall 42.

Upper outlet assembly 352 can preferably comprise an elbow 57 proximate the top of upper riser 55, within which a reducing bushing 58 can be preferably fastened. A nipple 59 can be preferably inserted through reducing bushing 58. Nipple 59 can be prevented from clogging by providing a strainer 60 over the end of nipple 59. Preferably, strainer 60 can be secured onto nipple 59. Nipple 59 can be preferably adjustable for intermediate sizes by adding an end cap with an orifice formed by a specific drill size, as applied to the lower orifice 51.

End cap 60 can be preferably sized and its elevation established by one of ordinary skill in the art to optimize the ponding time and depth to detain as much runoff as possible while treating large events. In storm events at typical rainfall intensities, the surface can pond up above the elevation of upper outlet 352. This can cause the ponding depth to increase, thus causing a corresponding increase in effective head. As a result, the formerly low percolation rate controlled by lower outlet 351 increases according to Darcy's Law in a manner such that flow rates in upper outlet 352 are many multiples of the low flow discharge rate. The potential benefit of having a flexible elevation for the upper outlet can be that its elevation is adjustable to respond to changes in infiltration rates that can occur over time. As sediments accumulate and the saturated hydraulic conductivity decreases, the outlet can be lowered to increase the effective head, thus maintaining effective infiltration responses. This can provide adaptive management to increase performance based upon the stabilized characteristics of the media.

The outlet system preferably provides a way to not only regulate small frequent flows to enhance nitrogen removal, and to respond to field infiltration rates, but also to utilize the capability of the rapid infiltration rate of the media to treat transient high flows that contain particulate matter that still needs to be filtered. The ability to adjust the elevation and diameter of the orifices can permit the systems to be responsive to changes in media infiltration rates or design discharge criteria. In combination with the improvements to the media sorption and infiltration response, the outlet configuration of embodiments of the outlet systems can improve nutrient repetition compared to free discharge systems with media not in accordance with the invention.

In accordance with preferred embodiments of the invention, the bioretention system can be suitable for wastewater and/or stormwater treatment. Various examples of the water treatment media as described herein can enhance the removal of phosphorus from these waste streams. Preferably, the media can permit retention of phosphorus while providing rapid drainage. The flows through the media can be preferably controlled by an outlet system in accordance with exemplary embodiments of the invention to extend residence time for improved nitrogen removal in the small events, which comprise the majority of annual runoff volumes. The outlet systems can be preferably designed and constructed to permit high flows in larger events, thus permitting the systems to treat even substantial events with minimal bypass flow left untreated.

Reducing urban runoff loads of soluble phosphorus (P) is important to minimize impairment of downstream freshwater bodies. While P retention by newly constructed bioretention systems is high, P retention in loamy sand media typically used in bioretention systems can persist for up to and sometimes over a half a decade of urban runoff loads. Systems in accordance with the invention can be amended with water treatment residuals, red mud and/or krasnozem soil, a clay with high iron content.

It has also been determined that the capability of typical bioretention media, without plants to assist in retaining phosphorus at stormwater concentrations, can become exhausted after several years. However, the presence of plants can considerably augment retention of phosphorus, far beyond that which is attributable to uptake.

It is to be understood that the examples provided hereafter are merely illustrative, as a matter of application specific to design choice, and should not be construed to limit the scope of the invention in any way.

Twenty-seven bioretention mesocosms, 240 L in size, were used to investigate hydraulic responses and dissolved nitrogen and phosphorus retention of bioretention systems in accordance with the invention. The media comprised krasnozem soils, red mud and water treatment residuals (WTRs), combined with sand and coir peat. All treatments except one were vegetated with shrubs and grasses, while one had no vegetation (barren). Table 1 presents the composition of the media treatments.

Even though there was a high proportion of fine materials in the media, saturated hydraulic conductivities were very high, with mean values ranging from 15.1 to 55.7 cm-h$^{-1}$. To extend detention time, all systems but one (the WTR-K nr treatment) were controlled by a dual-outlet configuration. This involved an unrestricted elevated outlet which conveyed outflow as a function of flow through media according to Darcy's Law. This outlet was generally close to the media surface and controlled outflow when the treatments were saturated and ponding occurred.

By adjusting its elevation to provide more or less effective head in response to replicate permeability, this arrangement resulted in similar ponding and drainage responses in replicates containing media with highly varying permeabilities. This arrangement reduced the potential bias of disparate retention times upon nutrient retention. To drain the treatments after each event, a 4 mm hose set at the bottom of the gravel layer drained at a lower flow rate (average 8.4 cm-h$^{-1}$). Unlike the upper outlet, this outlet controlled flow rates as a function of hydraulic properties that were more restrictive than that of the media, so its response was similar in all replicates. This outlet was throttled to very low discharge rates (±1 cm-h$^{-1}$) during the spring loading regime. Its elevation was raised above the drainage layer to provide saturated conditions in the bottom of the media.

During one study, the krasnozem and red mud mesocosms were with loaded weekly with 49 cm of tertiary effluent comprising 2.2 mg-l$^{-1}$ nitrogen oxides (NO$_x$) and 4.4 mg-l$^{-1}$ total nitrogen (TN) for 81 weeks. The WTR mesocosms were with loaded weekly with 49 cm of tertiary effluent comprising 2.2 mg-L$^{-1}$ NO$_x$ and 4.1 mg-L$^{-1}$ TN for 80 weeks. At six month intervals, the treatments were dosed with synthetic stormwater comprising 0.7 mg-L$^{-1}$ NO$_x$ and 1.1 to 1.6 mg-L$^{-1}$ TN, as shown in Table 2:

TABLE 1

Media composition of various treatments. Mineral proportions are by weight, as determined by oxalate extractable Fe and Al. Coir peat proportions are by volume.

| Media Type | Media Label | Turf Sand | Topsoil | Krasnozem Soil | Red Mud | Water Treatment Residual | Coir Peat |
|---|---|---|---|---|---|---|---|
| 10% Krasnozem | K10 | 93% | — | 7% | — | — | 12% |
| 20% Krasnozem | K20 | 75% | — | 25% | — | — | 12% |
| 40% Krasnozem | K30 | 57% | — | 43% | — | — | 12% |
| 30% Water Treat. Res. | WTR30 | 69% | — | — | — | 31% | 12% |
| 15% WTR-30% Kras. | WTR-K | 44% | — | 40% | — | 16% | 12% |
| 6% Red Mud | RM06 | 74% | 20% | — | 6% | — | 12% |
| 10% Red Mud | RM10 | 69% | 20% | — | 11% | — | 12% |

TABLE 2

Effluent and Stormwater loading characteristics, flow weighted concentrations ($mg\text{-}l^{-1}$), and mass loads ($kg\text{-}ha^{-1}$), total experiment and 80-81-week periods.

| Loading Regime | PO4 | TP | $NO_x$ | $NH_3$ | TN |
|---|---|---|---|---|---|
| Effluent Loading: February 2007-July 2007 | 3.69 | 4.59 | 2.32 | 0.99 | 4.69 |
| Effluent Loading: August 2007-January 2008 | 4.38 | 4.69 | 2.48 | 1.38 | 5.47 |
| Effluent Loading: March 2008-July 2008 | 3.41 | 3.93 | 2.84 | 0.74 | 5.09 |
| Effluent Loading: August 2008-January 2009 | 2.94 | 2.94 | 2.12 | — | 3.66 |
| Average Stormwater: August 2007 | 0.55 | 0.75 | 0.62 | 0.03 | 1.32 |
| Average Stormwater: February 2008 | 0.39 | 0.47 | 0.84 | 0.34 | 1.56 |
| Average Stormwater: August 2008 | 0.43 | 0.52 | 0.93 | 0.01 | 1.10 |
| Average Stormwater: February 2009 | 0.32 | 0.44 | 0.62 | — | 1.06 |
| Entire 110 week Mass Load ($kg\text{-}ha^{-1}$) | 1,601 | 1,821 | 1,125 | 346 | 2,182 |
| First 81 week Mass Load ($kg\text{-}ha^{-1}$) | 1,284 | 1,500 | 884 | 346 | 1,765 |
| Last 80 week Mass Load ($kg\text{-}ha^{-1}$) | 1,111 | 1,201 | 805 | 218 | 1,520 |

For each media type, the mesocosms were planted with local vegetation, providing 3 replicates for each treatment. The vegetated Krasnozem and Red Mud mesocosms contained two clumps of Swamp Foxtail Grass (*Pennisetum alopecuroides*) planted at opposite corners, and the woody shrubs Bottlebrush (*Callistemon pachyphyllus*) and Thyme-leaf Honey-myrtle (*Melaleuca thymifolia*) planted at the remaining corners. Knobby Clubrush (*Ficinia nodosa*) was planted in the center. The K20 treatment was duplicated without vegetation to compare its responses to the same treatment with vegetation. Instead of *P. alopecuroides*, the newer WTR treatments contained two *C. apressa* at opposite corners, *C. pachyphyllus* planted at one corner, with T*M. thymifolia* planted at the remaining corner, and *F. nodosa* planted in the center. All mesocosms were covered by a gravel mulch 2.5 cm deep.

It has also been determined that bioretention systems with well-established plants and long retention times can provide over about 70%, and even over about 90% total nitrogen (TN) retention from stormwater. This TN retention is enhanced by dense plantings that perform well for nutrient retention.

Replicated findings on nitrogen retention can be achieved, with over about 70%, even over about 90% dissolved nitrogen ($NO_x$) retention from stormwater.

Figure 5:
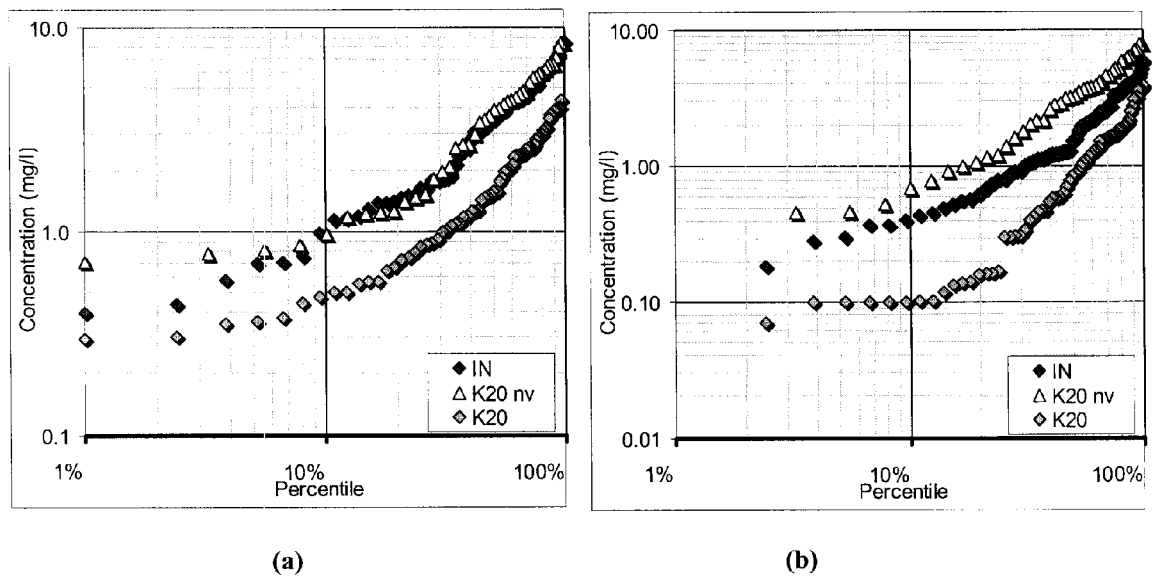
FIG. 5 shows in 5(a) and 5(b) nitrogen concentration reduction due to vegetation by systems in accordance with embodiments of the invention.

FIGS. 5a and 5b graphically present the frequency distribution of inflow and outflow concentrations of $NO_x$ and TN for the K20nv, and K20 treatments over the experiment. The data for other K10/40, K40 RM06 and RM10 treatments overlapped with those displayed, so they were omitted for clarity. Because K20nv treatments eventually became ineffective, their data was not collected after the first 81 weeks.

TN retention from wastewater when the plants were most established was as high as 63% in restricted WTR-K treatment, with the lowest retention being 43% found in the WTR30 treatments. In contrast to vegetated treatments, TN removal by barren media was less than 7%. NOx retention ranged from 72% to 45% in the vegetated treatments, while the barren treatment exported 72%. During the final stormwater run, TN retention ranged from −34% to 60%, while $NO_x$ retention ranged from 3% to 84%. The $NO_x$ and TN retention in the non-restricted treatment was the lowest, and was significantly lower than the corresponding controlled treatment, which was the highest. This documented the importance of retention time on improving N retention. In contrast to the vegetated treatments, TN and $NO_x$ were exported from the barren treatment during stormwater runs. Cumulative TN retention by vegetated treatments substantially exceeded projected plant uptake rates for N, suggesting that denitrification also contributes to TN removal in bioretention treatments.

Further confirming previous observations, FIG. 5a demonstrated how the barren treatments always leached higher concentrations of $NO_x$ compared to the inflows, while $NO_x$ retention in the vegetated treatments was substantial. $NO_x$ retention by vegetated treatments was particularly evident at the inflow concentrations below 1.5 $mg\text{-}l^{-1}$ during the stormwater runs, where outflow concentrations were nearly a log lower. These trends suggested that mass removal was generally a constant amount, regardless of inflow concentrations. In this process, small inflows loads will be reduced proportionately more than larger loads. These observations show that the treatments were occasionally capable of discharging $NO_x$ concentrations even below 0.1 $mg\text{-}l^{-1}$.

In contrast to the $NO_x$ results, FIG. 5b demonstrated that TN was retained by even the barren treatments, albeit much less effectively compared to vegetated treatments. As noted in the case of $NO_x$, the vegetated treatments performed better at inflow concentrations below 2.5 $mg\text{-}l^{-1}$, but the reductions were not as great as that observed for $NO_x$. However, relative TN retention performance at the higher effluent loading concentrations was better than that observed for $NO_x$. These data suggest a relatively uniform mass removal process in which smaller inflow loads will be proportionately reduced more than larger inflow loads. These systems were capable of discharging TN concentrations below 0.5 $mg\text{-}l^{-1}$.

Table 3 presents the N retention response of the mature treatments.

TABLE 3

Retention of Nitrogen Oxides and TN, Effluent Loading, August 2008-January 2009 ($kg\text{-}ha^{-1}$ and percentage of inflow load retained).

| | Nitrogen Oxides | | Total Nitrogen | |
|---|---|---|---|---|
| Treatment | Load | Percent | Load | Percent |
| Inflow | 221 | | 382 | |
| Uptake | 169 | | 169 | |
| K20 | 66 | 70% | 171 | 55% |
| K10/40 | 66 | 70% | 194 | 49% |
| K40 | 86 | 61% | 188 | 51% |
| RM06 | 64 | 71% | 154 | 60% |
| RM10 | 72 | 68% | 164 | 57% |
| WTR-Knr | 82 | 63% | 141 | 63% |
| WTR-K | 122 | 45% | 208 | 45% |
| WTR30 | 106 | 52% | 217 | 43% |

Over the first 81 weeks, cumulative $NO_x$ retention in the krasnozem and red mud treatments was as high as 49%, even with an average inflow concentration of 4.4 mg-$l^{-1}$. Over the last 80 weeks, cumulative $NO_x$ retention in the WTR treatments of the same age approached 47%, even with an average inflow concentration of 4.1 mg-$l^{-1}$.

It was also determined that N retention was much less variable in the new WTR treatments with much lower coefficient of variability in permeability. While the permeabilities of the non-restricted WTR-K nr treatments were not measured as they always exceeded the maximum inflow rates of 40 cm-$h^{-1}$, these treatments were remarkably consistent in terms of retention. These free discharge treatments discharged 49% more $NO_x$ and 47% more TN compared to the corresponding WTR-K treatments.

Figure 6:
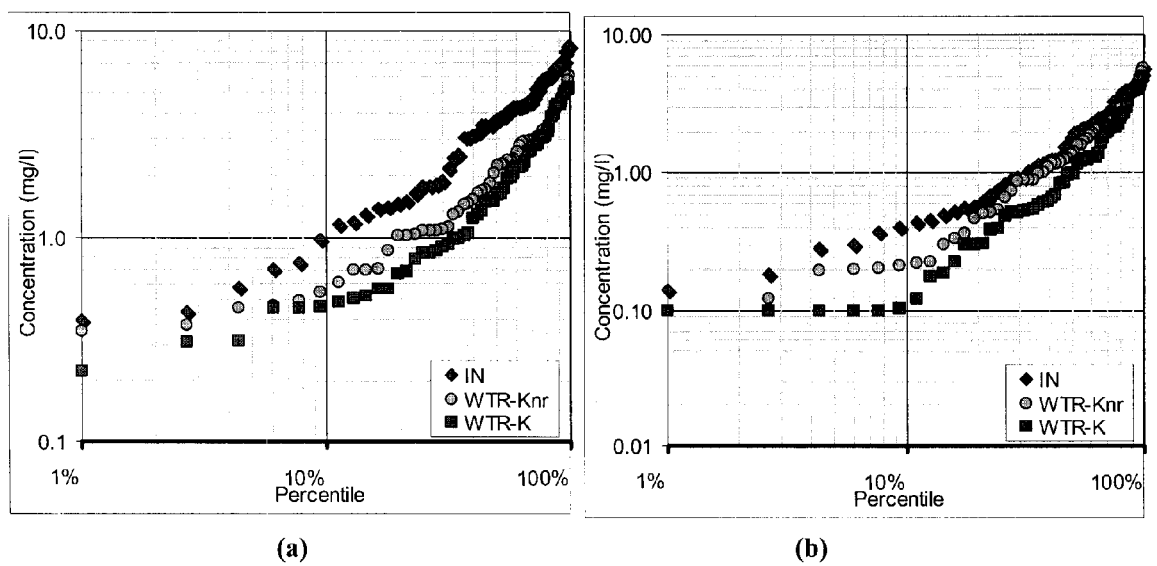
FIG. 6 shows in 5(a) and 5(b) nitrogen concentration reduction due to restricted outlets by systems in accordance with embodiments of the invention.

Further confirming previous observations, FIG. 6a demonstrated how the non-restricted WTR-Knr treatments nearly always leached higher concentrations of $NO_x$ compared to the corresponding WTR-K treatments. FIG. 6b demonstrated how the non-restricted WTR-Knr treatments nearly always leached higher concentrations of TN compared to the corresponding WTR-K treatments.

Generally, using up to 25% and 40% fine material by volume, the average saturated hydraulic conductivity of media 5 can exceed 20 inches per hour in vegetated treatments. These rates were rapid for material that contains such a high percentage of fine material. It was been determined that this high rate that can persist for over a year and even more than two or more years, and showed an improving trend in the vegetated treatments as they matured. In contrast, unvegetated treatments typically have less than half this rate, and showed a declining trend in infiltration rates.

This supports a conclusion that the system of the present invention can treat considerable runoff in a given period of time, including runoff from even high intensity rainfall events.

Systems of the present invention have dual stage outlets to reduce flow rates and extend retention times. Outlets in accordance with the invention were able to equalize effective flow rates, while still passing substantial flows without overflow. The systems were also able to extend retention time during low flows.

N retention in one treatment with no outlet controls was significantly lower than the corresponding controlled treatment, demonstrating how the increased retention time provided by the outlet improves N retention.

The findings demonstrate that considerable $NO_x$ and TN retention can occur in even rapidly draining bioretention systems, and that the presence of vegetation significantly increases retention. As a result of both plant uptake and denitrification, substantial TN retention can also be obtained in bioretention systems. At stormwater concentrations, $NO_x$ retention was as high as 95%, discharging at concentrations approaching the experimental detection limit. TN retention of stormwater in the older krasnozem treatments ranged from 66% to 80%. Discharging at an average concentration as low as 0.29 mg-$l^{-1}$, this suggests a lower limit for TN concentrations from bioretention systems. We have also documented that increasing retention time will substantially improve both $NO_x$ and TN retention, increasing retention and stormwater by up to 80% and 48% respectively.

Figure 7:
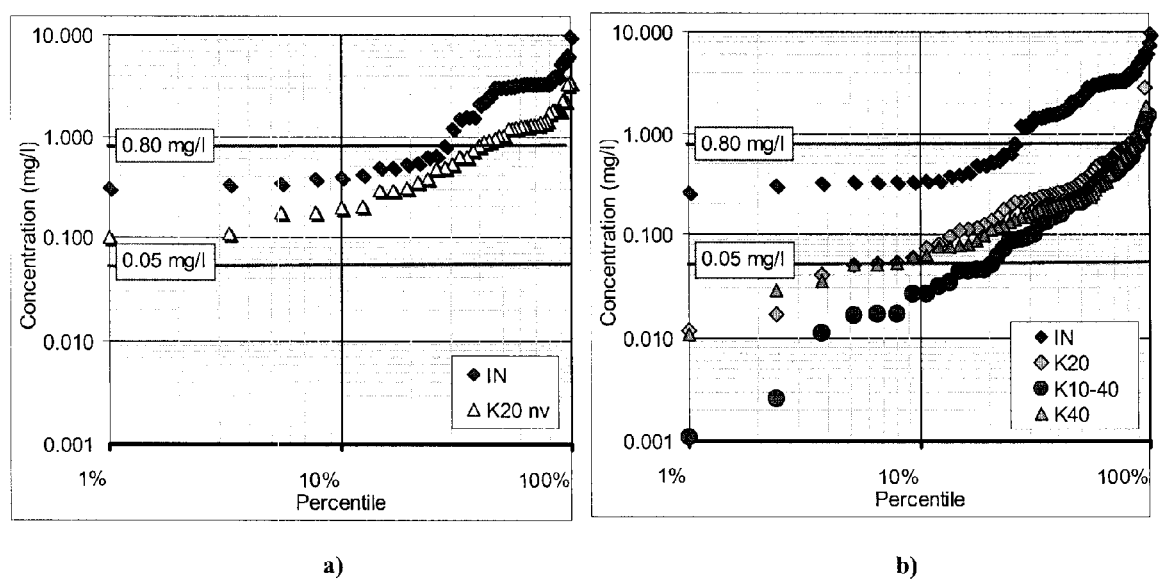
FIG. 7 shows in 7(a), 7(b) phosphorus concentration reduction by krasnozem systems in accordance with embodiments of the invention.

FIG. 7 presents cumulate frequency distribution of the krasnozem P retention responses; with FIG. 7(a) showing the unvegetated K20nv treatment, and FIG. 6(b) showing the vegetated krasnozem treatments. The threshold between stormwater runs and the effluent loading runs is shown as the 0.80 mg-$l^{-1}$ line, while the desired environmental criterion is shown as the 0.05 mg-$l^{-1}$ line. The K20nv treatment was incapable of meeting this criteria in any run, while the vegetated K20 treatments was able to meet this criteria in half the stormwater runs and the K10-40 treatment was able to meet in nearly all stormwater runs. There is a reduction of at least 90% in all effluent loading runs.

Figure 8:
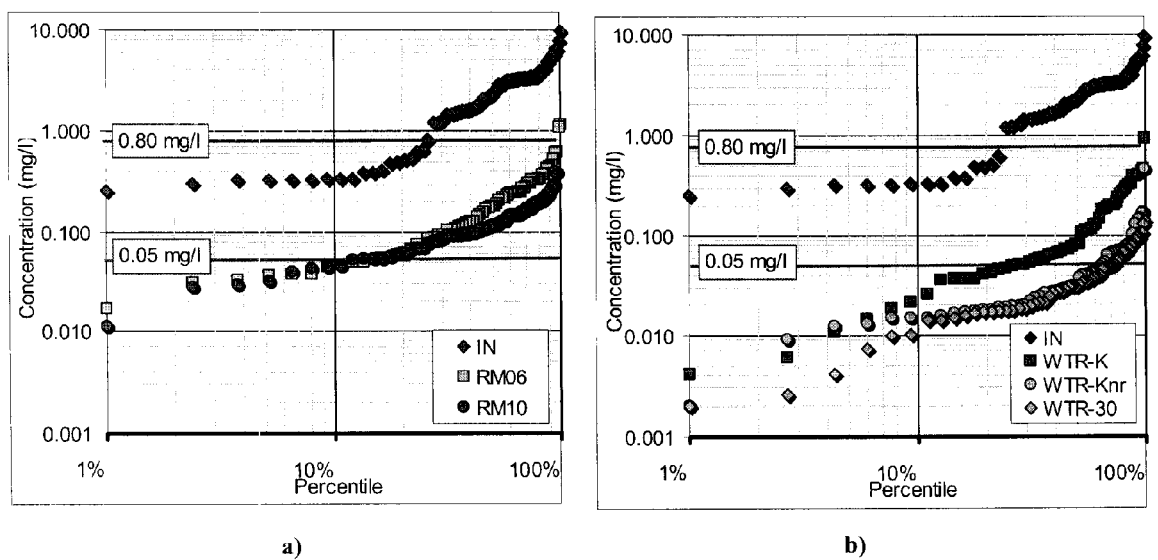
FIG. 8 shows in 8(a), 8(b) phosphorus concentration reduction by red mud and WTR systems in accordance with embodiments of the invention.

FIG. 8 presents cumulate frequency distribution P retention responses of the red mud and WTR treatments; with FIG. 8(a) showing the red mud treatments, and FIG. 8(b) showing the WTR treatments. The red mud treatments were able to meet the 0.05 mg-$l^{-1}$ criterion in over half the stormwater runs. There was a reduction over 90% in all effluent loading runs. The WTR treatments were able to meet the 0.05 mg-$l^{-1}$ criterion in all the stormwater runs. The WTR30 treatment was able to meet this criterion in over half of the effluent loading runs. There was a reduction over 98% in all effluent loading runs. Table 4 summarizes the results of the experiments.

TABLE 4

Retention of Ortho-phosphate, 80-81-week periods (kg-$ha^{-1}$ and percentage of inflow load retained).

| Treatment | Load | Percent |
|---|---|---|
| First 81 weeks | | |
| Inflow | 1,284 | |
| Uptake | 101 | |
| K20nv | 276 | 79% |
| K20 | 136 | 89% |
| K10/40 | 110 | 91% |
| K40 | 156 | 88% |
| RM06 | 100 | 92% |
| RM10 | 55 | 96% |
| Last 80 weeks | | |
| Inflow | 1,111 | |
| Uptake | 120 | |
| WTR-Knr | 55 | 95% |
| WTR-K | 16 | 99% |
| WTR30 | 12 | 99% |

Media in accordance with embodiments of the invention continued to retain substantial quantities of phosphorus, even at low discharge concentrations. Up to 92% even 99% total dissolved phosphorus (DP) removal from stormwater can be achieved in these systems after over a decade and even three decade's worth of stormwater loads.

By way of example, after 80 weeks of loading with wastewater loads, the media in accordance with an embodiment of the invention can show DP retention from wastewater of over 88% and even 99%.

The results also show that P retention by barren krasnozem media eventually becomes exhausted under long term loads. Improved media will delay this inevitable P saturation, but vegetation can be desirable, both for uptake and for its effect upon extending P sorption capacity. Even at inflow concentrations less than 0.40 mg-$l^{-1}$, substantial retention of P in stormwater persisted past two decades worth of stormwater loads in all media tested. The media did not show saturation in the K40 and WTR treatments, with an irreducible concentration as low as 0.003 mg-$l^{-1}$, below even the strictest discharge criteria for stormwater. This shows that media in accordance with the invention can reduce P loads from stormwater and wastewater.

There was a trend toward decreasing P retention as P accumulated and the media became more saturated. On the other hand, up to 99% of the total P load was retained in systems with the water treatment residuals, and there was a no trend in retention performance over time.

These results show that these amendments not only substantially improve P retention in bioretention systems; they also extend the usable life of the systems. Furthermore, these amendments can be both inexpensive and widely available.

The hydraulic experiments showed that very high saturated hydraulic conductivities can be obtained even with media containing very high proportions of clay minerals. In several treatments, there was a broad range of conductivities between replicates. To respond to these variations, an innovative outlet configuration was developed to retain flows to provide nearly identical responses. Not only did this configuration equalize flows compared to free discharge systems, they showed that the system responses can be tailored to the needs of the design. In locations where extensive treatment provided by extended detention is needed, the outlet can be configured accordingly. On the other hand, in an ultra-urban setting where systems are designed to filter high rates of flow, the outlets can be configured to retain small flows, while still treating even large events through the media, thus avoiding bypass flows. This greatly improves retention of sediments, metals and oil and grease. Furthermore, as sediments accumulate on the surface and reduce the effective rate, the outlets can be adjusted to improve rates. This capability for adaptive management is an emerging trend in the design of stormwater controls.

As described above, a water treatment system for removing substances from water flowing into the system in accordance with the invention can comprise a water treatment chamber comprising side walls, a bottom and an inlet. It can have at least one retention layer comprising a media formulated for phosphorus retention, comprising at least one of water treatment residuals, red mud, red gypsum, and iron or aluminum-rich soils within the water treatment chamber, the retention layer positioned to receive water from the inlet. The system can have an area of at least 36 square feet, a volume of waste water of at least over about 36 cubic feet as a depth of 1 feet multiplied by the area of the filtration layer, per hour.

Systems in accordance with the invention can have a drainage layer under retention layer, and be constructed and arranged so that water treated through the retention layer can be collected by the drainage system. The drainage system can be under the inlet and retention layer, and within a drainage layer, constructed and arranged so that water to be treated can flow from the inlet, through the retention layer to the drainage system. The drainage system can be constructed to direct water that passed through the retention layer outside of the water treatment chamber.

The retention layer can be made effective to treat a depth at least of over about 12, preferably over about 24 and more preferably over about 36 inches of water passing through the layer within 24 hours, such water having a nitrogen content of at least about 0.50 mg-l$^{-1}$, and/or a phosphorus content of at least about 0.30 mg-l$^{-1}$ and reducing that nitrogen content by at least about 40%, preferably about 80% and/or reducing the phosphorus content by at least about 90%, preferably about 95%. The retention layer can reduce that nitrogen content by at least about 40% and/or reduce the phosphorus content by at least about 90%.

The walls of the water treatment chamber can be substantially impermeable to water flow and the bottom permeable to water flow out of the chamber. The drainage system can comprise a network of drainage pipes/tubes, at least one of which extends through and out of the water treatment chamber and terminates with a flow control mechanism. That mechanism can be constructed and arranged to automatically regulate the flow of water out of the water treatment chamber at different flow rates, in proportion to the pressure head of water flowing through the filtration layer. This can permit adaptive management to control flow dynamics in response to changes in either media and/or soil infiltration rates, and/or changes in required discharge criteria. The flow control mechanism can have a tube receiving water from the water treatment chamber in fluid communication to at least a first and a second outlet opening, the second outlet opening positioned at a height above the height of the first outlet opening so that at a first pressure, water will flow out the lower outlet opening only, but at a second sufficiently higher pressure, water will flow out of both outlet openings.

Thus, while there have been shown and described and pointed out novel features of embodiments of the present invention, it will be understood that various omissions and substitutions and changes in the form and details of the disclosed invention may be made by those skilled in the art without departing from the spirit of the invention.

It is also to be understood that the following claims are intended to cover all of the generic and specific features of the invention herein described and all statements of the scope of the invention which, as a matter of language, might be said to fall therebetween.

What is claimed is:

1. A water treatment system for removing substances from water flowing into the system, comprising:
   a water treatment chamber comprising side walls, a bottom and an inlet;
   at least one retention layer comprising a media formulated for phosphorus retention, comprising at least one of water treatment residuals, red mud, red gypsum, and iron or aluminum-rich soils within the water treatment chamber, the retention layer positioned to receive water from the inlet;
   a drainage layer under the retention layer, constructed and arranged so that water treated through the retention layer can be collected by a drainage system;
   the drainage system under the inlet and retention layer, and within a drainage layer, constructed and arranged so that water to be treated can flow from the inlet, through the retention layer to the drainage system;
   the drainage system constructed to direct water that passed through the retention layer outside of the water treatment chamber; and
   the retention layer effective to treat a depth at least of over 24 inches of water passing through the layer within 24 hours, such water having a nitrogen content of at least 0.50 mg-l-1 or a phosphorus content of at least 0.30 mg-l-1 and reducing that nitrogen content by at least 40% or reducing the phosphorus content by at least 90%.

2. The system of claim 1, wherein the retention layer is at least 12 inches thick.

3. The system of claim 2, wherein the retention layer comprises water treatment residuals.

4. The system of claim 1, wherein the walls of the water treatment chamber are substantially impermeable to water flow and the bottom is permeable to water flow out of the chamber.

5. The system of claim 1, wherein the drainage system comprises a network of drainage tubes, at least one of which extends through and out of the water treatment chamber and terminates with a flow control mechanism constructed and arranged to automatically regulate the flow of water out of the water treatment chamber at different flow rates, in proportion to the pressure head of water flowing through the filtration layer.

6. The system of claim 5, wherein the flow control mechanism comprises a tube receiving water from the water treatment chamber in fluid communication to at least a first and a second outlet opening, the second outlet opening positioned at a height above the height of the first outlet opening so that at a first pressure, water will flow out the lower outlet opening only, but at a second sufficiently higher pressure, water will flow out of both outlet openings.

7. The system of claim 1, comprising media in the water treatment chamber receiving water from the inlet and an effective amount and type of plant life growing in the media to assist in the removal of nitrogen and/or phosphorus contaminants.

8. The system of claim 1, wherein the retention layer comprises water treatment residuals.

9. A method of treating water, comprising: forming a retention layer comprising a media formulated for phosphorus retention, comprising at least one of water treatment residuals, red mud, red gypsum, and iron or aluminum-rich soils; an inlet directing rain water runoff or wastewater, such water having a nitrogen content of at least 0.50 mg-l-1 or more or phosphorus content of at least 0.30 mg-l-1, directing the water to the retention layer; and allowing the water to flow downwards through the filter layer to reduce that nitrogen content by at least 50% and reduce that phosphorus content by at least 90%.

10. The method of claim 9, wherein the rain water runoff or wastewater has a nitrogen content of at least 0.50 mg-l-1 or a phosphorus content of at least 0.30 mg-l-1, directing the water to the retention layer; and allowing the water to flow downwards through the retention layer to reduce that nitrogen content by at least 60% or reduce the phosphorus content by at least 90%.

11. The method of claim 9, wherein rain water is directed to the retention layer from a paved street.

12. The method of claim 9, wherein one or more plants are planted above the retention layer and assist in the processes that remove nitrogen and/or phosphorus from the water.

13. The method of claim 9, wherein the water is directed onto the retention layer, which has an area of at least 36 square feet, and wherein the volume of the waste water is at least 36 cubic feet as a depth of 1 feet multiplied by the area of the-retention layer, per hour, the water containing phosphorus and nitrogen, the retention layer comprising a media formulated for phosphorus retention, comprising at least one of water treatment residuals, red mud, red gypsum, and/or iron or aluminum-rich soils, allowing the water to pass through the media to reduce the nitrogen content by at least 60% or reduce that phosphorus content by at least 90%.

14. The method of claim 9, wherein the retention layer comprises water treatment residuals.

15. A system for treating water, comprising:
a retention layer comprising a media formulated for phosphorus retention, comprising either water treatment residuals, red mud, red gypsum, or iron or aluminum-rich soils; at least one drain pipe under the filter layer constructed and arranged to draw water away from the bottom of the filter layer;
the drain pipe extending to an outlet system, the outlet system including at least first and second openings in fluid communication with the drain pipe, the second opening at a height above the first opening.

16. The system of claim 15, wherein the first opening is in fluid communication with and at the distal end of a conduit, and the height of the first opening can be selectively adjusted by selectively rotating the conduit.

17. The system of claim 15, wherein the second opening is in fluid communication with and at the distal end of a conduit, and the height of the second opening can be selectively adjusted with respect to the height of the first opening by selectively moving the conduit.

18. The system of claim 15, wherein the height of the second opening is substantially within or even above the height of the retention layer.

19. The system of claim 15, wherein the retention layer comprises a layer of soil over a layer comprising a media formulated for phosphorus retention, comprising at least one of water treatment residuals, red mud, red gypsum, or iron or aluminum-rich soils, and an effective amount and type of plant life growing in the media, to assist in the removal nitrogen and/or phosphorus contaminants from the water, and the height of the second opening is within or above the layer of media.

20. The system of claim 15, wherein the retention layer comprises water treatment residuals.

* * * * *